United States Patent [19]
Hof et al.

[11] Patent Number: 5,307,151
[45] Date of Patent: Apr. 26, 1994

[54] METHOD AND APPARATUS FOR THREE-DIMENSIONAL OPTICAL MEASUREMENT OF OBJECT SURFACES

[75] Inventors: Albrecht Hof, Aalen; Adalbert Hanssen, Konigsbronn, both of Fed. Rep. of Germany

[73] Assignee: Carl-Zeiss-Stiftung, Heidenheim/Brenz, Fed. Rep. of Germany

[21] Appl. No.: 923,105

[22] Filed: Jul. 30, 1992

[30] Foreign Application Priority Data

Sep. 11, 1991 [DE]  Fed. Rep. of Germany ....... 4130237

[51] Int. Cl.⁵ .............................. G01B 11/24
[52] U.S. Cl. .............................. 356/376; 250/237 G
[58] Field of Search ............... 356/376; 250/237 G

[56] References Cited

U.S. PATENT DOCUMENTS

| | | | |
|---|---|---|---|
| 4,488,172 | 12/1984 | Hutchin | 356/4 |
| 4,641,972 | 2/1987 | Halioua et al. | 356/376 |
| 4,937,445 | 6/1990 | Leong et al. | 250/237 G |
| 5,175,601 | 12/1992 | Fitts | 250/237 G |

FOREIGN PATENT DOCUMENTS

| | | |
|---|---|---|
| 0076866 | 5/1985 | European Pat. Off. |
| WO9109273 | 6/1991 | PCT Int'l Appl. |
| 2204397 | 11/1988 | United Kingdom. |

OTHER PUBLICATIONS

"Scanning moiré method and automatic measurement of 3-D shapes", by M. Idesawa et al., Applied Optics, vol. 16, No. 8, Aug. 1977, pp. 2152-2162.

"Interferometric phase measurement using spatial synchronous detection", by K. H. Womack, Optical Engineering, Jul./Aug. 1984, vol. 23, No. 4, pp. 391-395.

"Three dimensional inspection using multistripe structured light", by J. A. Jalkio et al., Optical Engineering, Nov./Dec. 1985, vol. 24, No. 6, pp. 966-974.

*Primary Examiner*—Jill A. Johnston
*Assistant Examiner*—Rachel Freed
*Attorney, Agent, or Firm*—Eugene Stephens & Associates

[57] ABSTRACT

A single projector is used to project a grating pattern on the surface of the object being measured, and the grating pattern is recorded simultaneously by two cameras from two different directions relative to the direction of projection. Both cameras record images of the same object areas. The fringe phases of the image patterns recorded by each of the two cameras are computed separately; and the object coordinates, which are computed from the combination of the computed fringe phases of both cameras, are unambiguous within a large measured range.

27 Claims, 5 Drawing Sheets

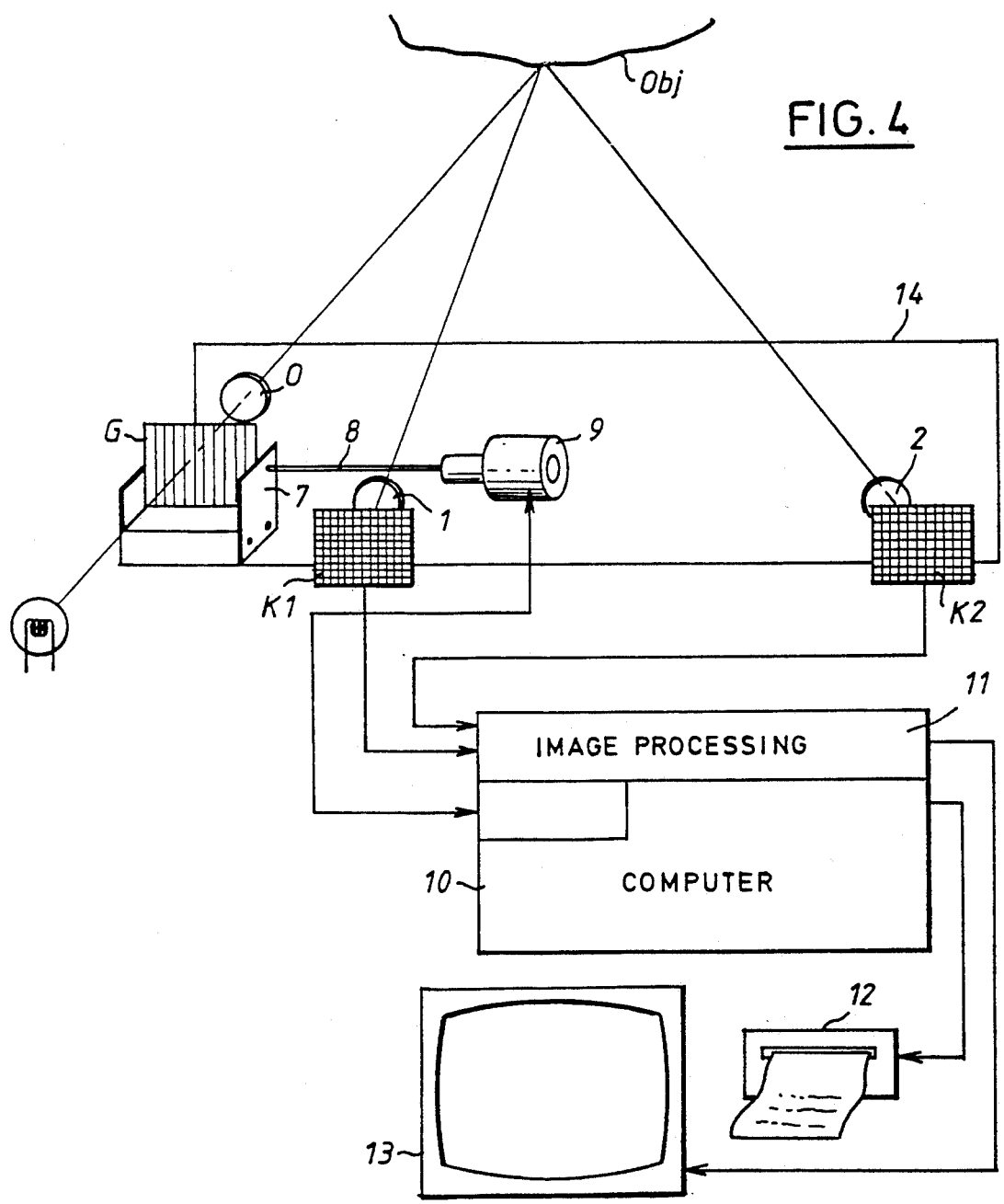

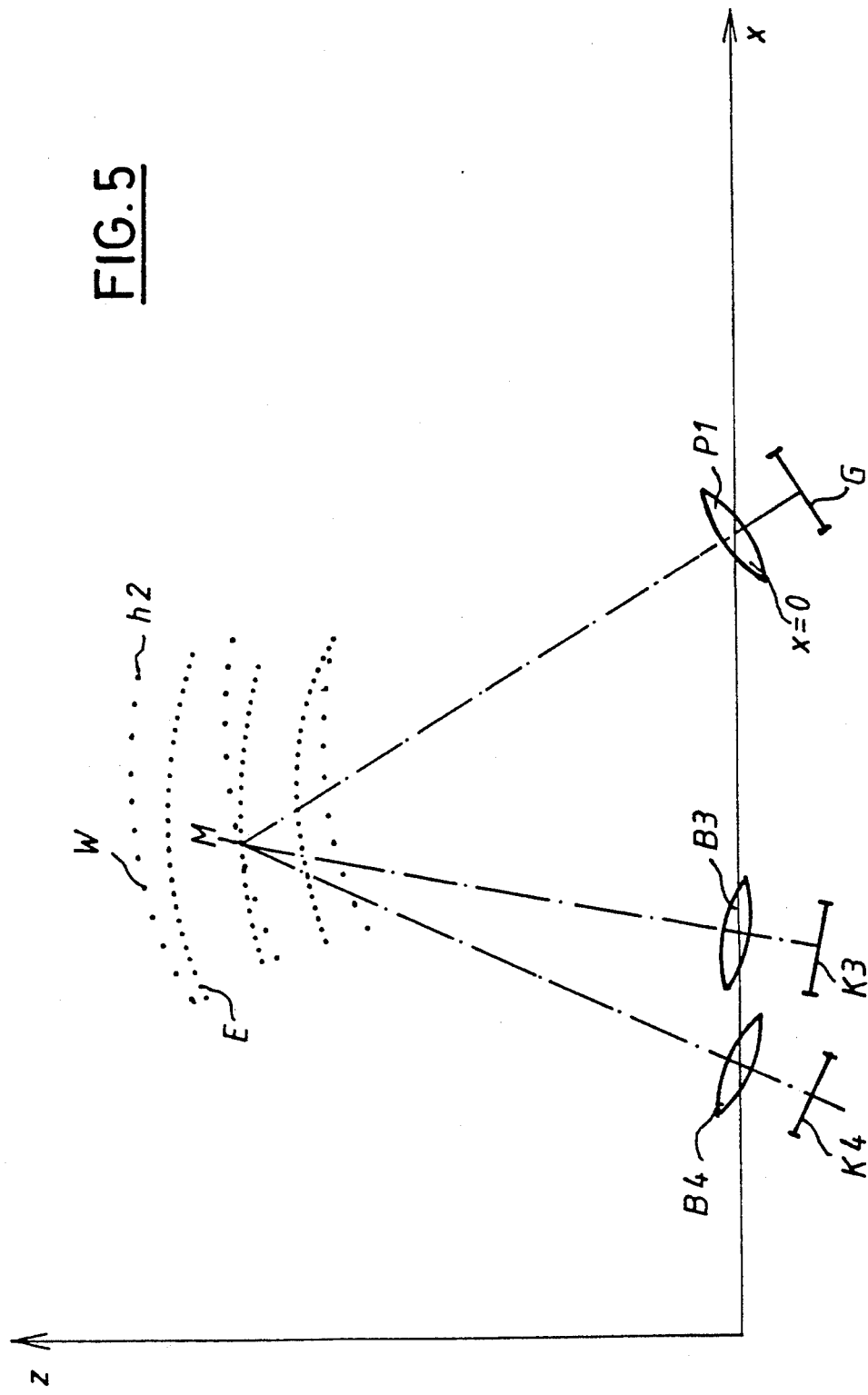

METHOD AND APPARATUS FOR THREE-DIMENSIONAL OPTICAL MEASUREMENT OF OBJECT SURFACES

TECHNICAL FIELD

The present invention relates to methods and apparatus for three-dimensional measurement of object surfaces, whereby a grating pattern projected on a surface is recorded by video cameras and the object surface is computed in an analytical computer.

BACKGROUND

An example of a measuring method and a related measuring device of this general type is disclosed in an article in *Optical Engineering*, Vol. 24 (1985), page 966. In that disclosure, a pattern of narrow light stripes and large dark, intermediate spaces is projected on the object to be measured. The grating pattern, which is deformed on the object surface, is recorded with two cameras; and the deformation of the brightness pattern evaluated. A second camera assures that reference coordinates and the object are measured in chronological order. To prevent synchronization problems during camera readout, both cameras project an image of the object on the same camera target. The disadvantage of this prior art arrangement is that the object surface is measured only along the light stripes between which are relatively wide intermediate spaces where no measurement takes place. Therefore, in order to capture the topography of the object surface completely, eight measurements must be performed successively with shifted patterns. Furthermore, the relative measuring resolution is relatively low, namely, being 50/1 (measuring range/measuring resolution) perpendicular to the sample surface.

U.S. Pat. Nos. 4,641,972 and 4,488,172 disclose so-called grating projection systems. In these disclosures, sinusoidal brightness patterns are projected on the object surface and the patterns are recorded with a single camera. Three or four images are recorded in chronological order, whereby the pattern is shifted by one-third or one-fourth of a grating period between the recording of images. The grating patterns are evaluated by means of algorithms known from phase shift interferometry, whereby the grating phase can be determined to approximately $2*\pi/100$. The disadvantage of these prior art systems is that the phase evaluation produces unambiguous measured results only within one grating order. To solve this problem, U.S. Pat. No. 4,641,972 uses so-called phase unwrapping which has also been known from interferometry. Phase unwrapping requires that the surface be continuous and a starting point be known. When the measured values are noisy, this method may compute an erroneous measured value and then continue in an erroneous manner so that large-area errors occur in the measured result. This method fails entirely when the measured object is discontinuous.

To increase the range over which the measurement is unambiguous, U.S. Pat. No. 4,488,172 has disclosed the projection of two grating patterns whereby one grating pattern has eight times the period width of the other grating pattern. When the patterns are phase-shifted, however, they move at different speeds or by different distances perpendicular to the direction of the projected stripe. As a result of this, the relative order of the grating pattern with respect to the coordinate system of the equipment may easily be lost.

EP-OS 0,076,866 discloses the simultaneous projection of three color-coded patterns on the object, whereby the patterns are phase-shifted by 120 degrees relative to each other. The grating patterns deformed by the object surface are recorded corresponding to their color coding by three associated color-selective cameras. As a result of this, the pattern is recorded simultaneously in three different phase relations so that an evaluation based on the phase shift algorithm may be performed without requiring a mechanical shifting. However, the use of three cameras does not accomplish an expansion of the unambiguous range.

UK Patent Application No. 2,204,397A discloses a measuring system where three projector/camera systems are positioned at an angle of 120 degrees relative to each other around the center of the measured volume. Each camera records an image of the pattern which is generated by the projector. The use of three projector/camera systems permits the measurement of all sample surfaces of an object positioned in a measured volume. This system also does not result in an expansion of the unambiguous range in the direction of the optical axes of the projectors.

U.S. Pat. No. 4,937,445 discloses apparatus with which grating patterns are projected on the surface of the object and then recorded with two CCD cameras. Both CCD cameras are positioned at the same distance from the center of projection of the grating projector and record images of different grating patterns projected on the object. Two linear image sensors are used only to divide in half the number of lines projected on each image sensor. The evaluation by the image sensors is analogous to the above-cited *Optical Engineering* reference, in that the lateral position of the projected stripes is measured. In this case, grating phases are not computed.

Further, PCT International Application Publication WO 91/09273 discloses a photogrammetric measuring device whereby three cameras record images of the measured object and at the same time a reference pattern is superimposed on the images of the measured object. However, this recent prior art system does not project a grating pattern on the object, nor does it compute fringe phases based on the video images.

The present invention is a measuring system of the type identified above, and its objects are to accomplish the desired three-dimensional measurement of object surfaces with (a) less complex apparatus, (b) a high depth resolution, and (c) an expanded range of unambiguous measurement. The methods and apparatus of the invention are also intended to permit the measurement of discontinuous object surfaces.

SUMMARY OF THE INVENTION

In accordance with the invention, a grating pattern is projected on the object surface by a single grating projector, and the grating pattern is recorded simultaneously by two cameras from two different directions relative to the direction of projection. The measured volume is within this range which, at the same time, is located within the view cone (illumination cone) of the projector and the view cones (observation cones) of the two cameras. Therefore, both cameras record images of the same object areas. The fringe phases of the image patterns recorded by each of two cameras are computed separately; and the object coordinates, which are unambiguous within a large measured range, are computed based on the combination of the computed fringe phases of both cameras.

The fringe phases of the grating patterns recorded by each camera are computed by phase shift algorithms known from interferometry. Then, the grating pattern is shifted several times successively on the measured surface; and, following each successive shift, an image of the grating pattern deformed on the object surface is recorded with both cameras. (Note, however, that it is also possible to compute the fringe phases based on individual video images. Appropriate algorithms are known from, for example, *Optical Engineering*, Vol. 23, (1984), page 391, or applicants' earlier German Application P 40 14 019.9, U.S. patent application Ser. No. 07/694,656.)

The procedure for combining the fringe phases of the pattern recorded with separate cameras is, preferably, the following: First, based on the fringe phase at one image point of the first camera, all the possible solution coordinates are determined for that image point. The solution coordinates are those points within the measured volume which have the same fringe phase, i.e., the same phase remainder, however, a different fringe order. These solution coordinates are located on a straight line which is defined by the imaging center of the lens of the first camera and the position of the image point on the camera sensor. The locations of these solution coordinates on the straight line generally are a function of the geometric configuration of the corresponding measuring device. Generally, several solution coordinates are computed for each camera pixel and associated phase values computed from the measurements.

For each solution coordinate, an image point on the second camera is determined from the positions of the two cameras relative to each other and from the imaging widths of the two cameras, the latter being based upon the distance of the camera sensors from the camera lenses. In some cases, one or more of the computed image points on the second camera are not located on the nominal position of a photosensitive pixel of the camera sensor. In such cases, the fringe phase belonging to this image point is computed by interpolating phase values measured in adjacent camera pixels. Such an interpolation also permits the consideration of sudden order jumps of the fringe phases between adjacent camera pixels.

For further evaluation, a second set of solution coordinates is computed preferably by associating each image point on the second camera with a solution coordinate and the fringe phase measured (or interpolated) there. While this second set of solution coordinates is computed analogously to the first set of solution coordinates, the computations are based on the fringe phases of the grating pattern recorded with the second camera. From these two sets of solution coordinates, the pair of coordinates with the smallest quantitative distance between the two values is selected. Ideally, this distance is zero so that both selected solution coordinates represent the coordinate to be found on the object surface. If the two selected solution coordinates are not equal, both solution coordinates still describe the coordinate on the object surface within the attained measured resolution. The final measured value is represented by that solution coordinate of the selected pair obtained with the camera which has the greater distance transverse to the projected grating.

However, in one particularly preferred embodiment, the computation of the second set of solution coordinates is omitted. Instead, the differences between the fringe phases at the image points of the second camera for the first solution coordinate and the fringe phase of the corresponding image point of the first camera are computed; and that image point of the second camera is selected for which the fringe phase quantity difference is minimal. Then the coordinate of the object surface is computed based on one selected fringe phase.

Suitable apparatus for carrying out the inventive measuring procedure comprises a grating projector, at least two video cameras (which record the same grating pattern projected on the object surface), and an analytical computer. With this arrangement, the lens of the first camera is located at a first distance that is very close to the lens of the projector, while the lens of the second camera is located relatively far from the lens of the projector, preferably at some multiple of the first distance. The distance of the first camera lens may be chosen in such a manner so that, for all points within the measured volume, the corresponding fringe phase recorded with the first camera will fall within the same fringe order. For each point in the first camera image, the object coordinate can be computed in an unambiguous (but quite inaccurate) manner based on the fringe phase and the known fixed fringe order. The second camera lens is at several times that distance from the projector. At all times the distances of the object-side main points of the lenses of the camera and of the projector are determining factors. The grating phase with the second camera represents a highly accurate (but ambiguous) measured value, the order of which is determined in an unambiguous manner by the approximate measured value obtained with the first camera.

In another embodiment, both camera lenses are positioned in such a manner that the distance between them is small relative to the distance to the projection lens, i.e., the distances between the object-side main points of both camera lenses are located closely adjacent to each other. Although this requires more complex computations, highlight problems are eliminated because the angle between the direction of illumination and the two viewing directions is almost the same.

In one simple preferred embodiment, the projector comprises a Ronchi grating. However, the grating patterns may also be generated interferometrically.

The computations required for evaluation are particularly easy when the measured object-side main points on the camera lenses are arranged on a single plane, and when the projection grating and the sensor surfaces of the cameras are arranged on planes parallel thereto.

In another embodiment, the optical axes of the camera and projector intersect in a point approximately in the middle of the measurement volume. With this arrangement, commercially available video cameras may be used, and the optical axis of the lens intersects the camera target approximately in the center. However, in this case the entire formula as disclosed in *Applied Optics*, Vol. 16, page 2152 (1977), must be used.

DRAWINGS

FIG. 4 shows a perspective illustration of the apparatus arranged in accordance with the first embodiment.

FIG. 5 shows the geometric setup of a second embodiment.

DESCRIPTION OF PREFERRED EMBODIMENTS

Figure 1:
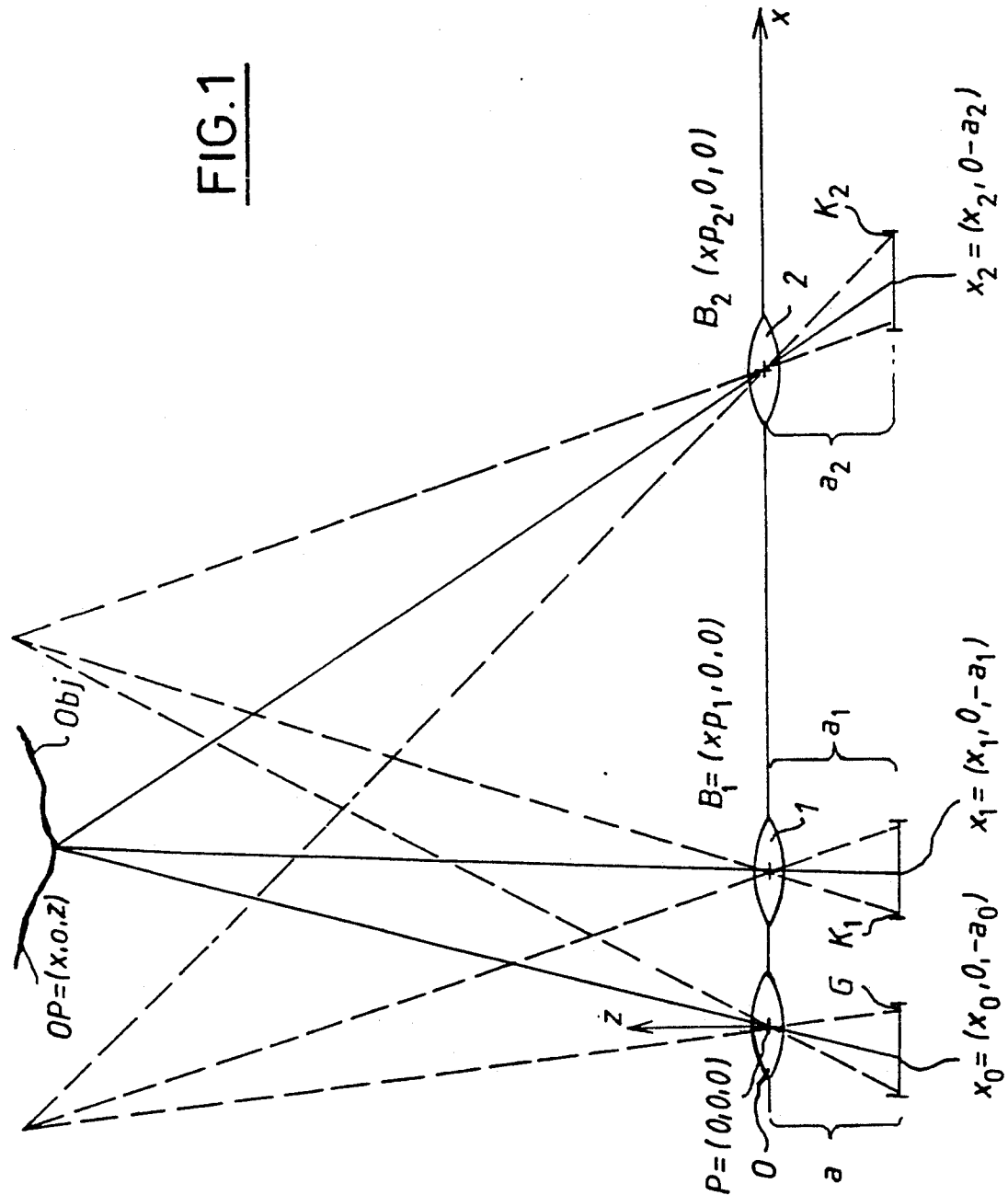
FIG. 1 shows a diagram of the geometric setup of a first embodiment.

The measuring device of FIG. 1 comprises a grating projector with a projection lens (0), as well as two cameras, of which only their lenses (1, 2) and respective sensors ($K_1$, $K_2$) are shown. In order to simplify the mode of mathematical expression, the projection grating and the camera sensor chips are referred to as "projection planes"; and they are identified as 0=projector, 1 and 2=cameras. For further explanation, the illustrated coordinate system is used, namely: The measured object-side main points of the three lenses (0, 1, 2) are on the plane Z=0. Their coordinates are [0,0,0] (projector), [$xp_i$, $yp_i$, 0] (i=1, 2 cameras). The main effect is attributed to the distances $xp_i$, i.e., that direction component transverse to the grating lines on the grating plane.

Installed parallel to the Z-planes are the projection grating (G) and the camera chips ($K_1$, $K_2$) in such a manner that all three view cones cover the measured volume. The object (Obj) is located within the measured volume. The distances of the projection planes from the rear main point (=facing away from the measured object) are for i=0, 1, 2.

To simplify matters, the drawings show the lenses with coinciding main points and the computations were performed accordingly. (NOTE: If lenses with a main point distance not equalling zero are used, the relevant projection plane must be shifted by the main point distance; and the lateral shift by the rear main points must also be taken into consideration.)

The projection grating pattern extends in the Y-direction, i.e., perpendicular to the drawing plane. The same applies to the columns of the camera-sensor pixels. On the projection planes, local coordinates [xi, yi] i=0..2 (without subscripted i) are used, which have zero points at [$xp_i$, $yp_i$, $-a_i$] in the apparatus coordinate system. The grating period of the projection grating is assumed to be $g_0$; the column distances of the cameras are to be $g_1$ and $g_2$. For simplification, it is assumed that at the coordinate of origin of the local coordinate system, the grating phase is zero. FIG. 1 shows the measuring device in the XZ-plane where all Y-coordinates are zero. As illustrated by the following observations, the object coordinates (y≠0) can be measured.

A point [x, y, z] in the measured volume is selected. Its image on the projection grating is at x0, y0]:=$[-a_0*x/z, -a_0*y/z]$ and its image on the cameras is at [xi, yi]:=$[-a_i*(x-xp_i)/z, -a_i*(y-yp_i)/z]$.

The following applies to the differences $x0-(a_0/a_i)*xi$:

$$x0-(a_0/a_i)*xi = -a_0*x/z+(a_0*a_i/a_i)*(x-xp_i)/z = -a_0*xp_i/z$$

In the illustrated geometric setup of projectors and cameras, the differences are a function of only z and not of x and y. The minuend is composed of the viewed fringe phase and fringe order; the subtrahend is the column distance of the camera pixel from the corresponding zero position ($xp_i$) re-scaled for the projection grating.

The difference may be expressed as follows:

$$x0-(a_0/a_i)*xi=(n_i+d_i)*g_0$$

where $0 \leq d_i \leq 1$

Hereinafter $x0-(a_0/a_i)*xi$ is called the phase difference and $d_i$ represents the beat phase between the projector and the $i^{th}$ camera. Different therefrom, the part which does not represent an integer, namely, the fractional part of $x0/g_0$, represents the grating phase. That is, the fractional part of $x0/g_0$ represents the primary result of the phase measurement. If the right sides of the last two equations are set equal to each other, the following can be seen:

$$(n_i+d_i)*g_0 = -a_0*xp_i/z \text{ or }$$

$$z = -a_0*xp_i/(g_0*(n_i+d_i)).$$

Figure 2A:
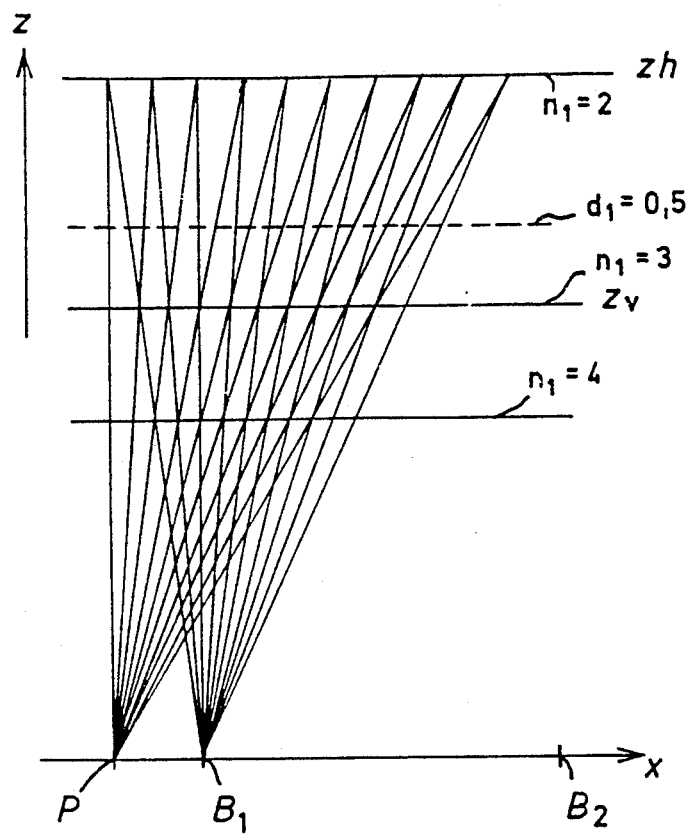
FIGS. 2a and 2b are diagrams indicating respective areas having the same beat phase for each of two cameras having respective lenses positioned at different distances from the projector lens, as shown in FIG. 1.

By measuring the grating phase and considering the pixel coordinate, only $d_1$ and $d_2$ can be determined. If $xp_1$ is selected appropriately small, $d_1$ changes over the total measured volume only from 0 to 1, i.e., the range covers $z_v := -a_0*xp_1/(g_0*n_1)$ to $z_h := -a_0*xp_1/(g_0*(n_1-1))$. FIG. 2a shows these conditions for the projector (O, P) and the camera (1, B1) which is the closest in the X-direction. The diverging lines are viewing lines of the projection grating or viewing lines of an imaginary grating with $a_0/g_0=a_i/g_i$ on the camera. The horizontal lines show the locations of equal phase differences having orders $n_1=2$ corresponding to the rear end ($z_h$) of the measured volume and $n_1=3$ corresponding to the front end ($z_v$). The broken horizontal line indicates the Z-plane, $d_1=0.5$.

Considering $a_1=a_2=a_0$, it can be easily derived from the above shown relation that $$(x0-x2)=(xp_2/xp_1)*(x0-x1).$$

Figure 2B:
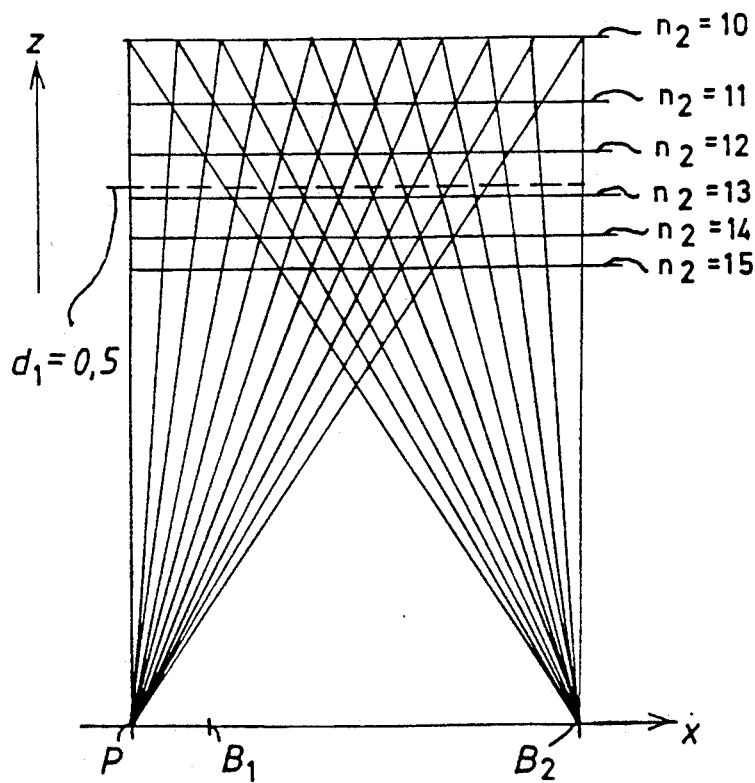

FIG. 2b shows these conditions for the projector (O, P) and the camera (2, B2). Inasmuch as in that case $xp_2=5*xp_1$, 5 short orders can be seen between $z_v$ and $z_h$, where the long beat passes through one order. Drawn in horizontal direction are the lines having the phase differences for $n_2=10$ (corresponding to $z_h$) to $n_2=15$ (corresponding to $z_v$). Inasmuch as $$TI \ (x0-x2)=(n_2+d_2)*g$$

it follows that $$n_2=int((x0-x2)/g-d_2)=int((xp_2/xp_1)*(x0-x1)/g-d_2)=int((xp_2/xp_1)*(n_1+d_1)-d_2).$$

This relation results in the order $n_2$ of the short beat from the measured value $d_1$, without requiring first the computation of z'. At the same time the formula indicating the dimensioning of $xp_2$ is obtained, whereby unambiguous measurements in the volume are assured: When all fringe phases are determined with an accuracy d, $xp_2$ is selected in such a manner that $(xp_2/xp_1)<(1/d)$. Now $n_2$ can be used to determine z:

$$z=-a_0*xp_2/((n_2+d_2)*g)$$

Figure 3A:
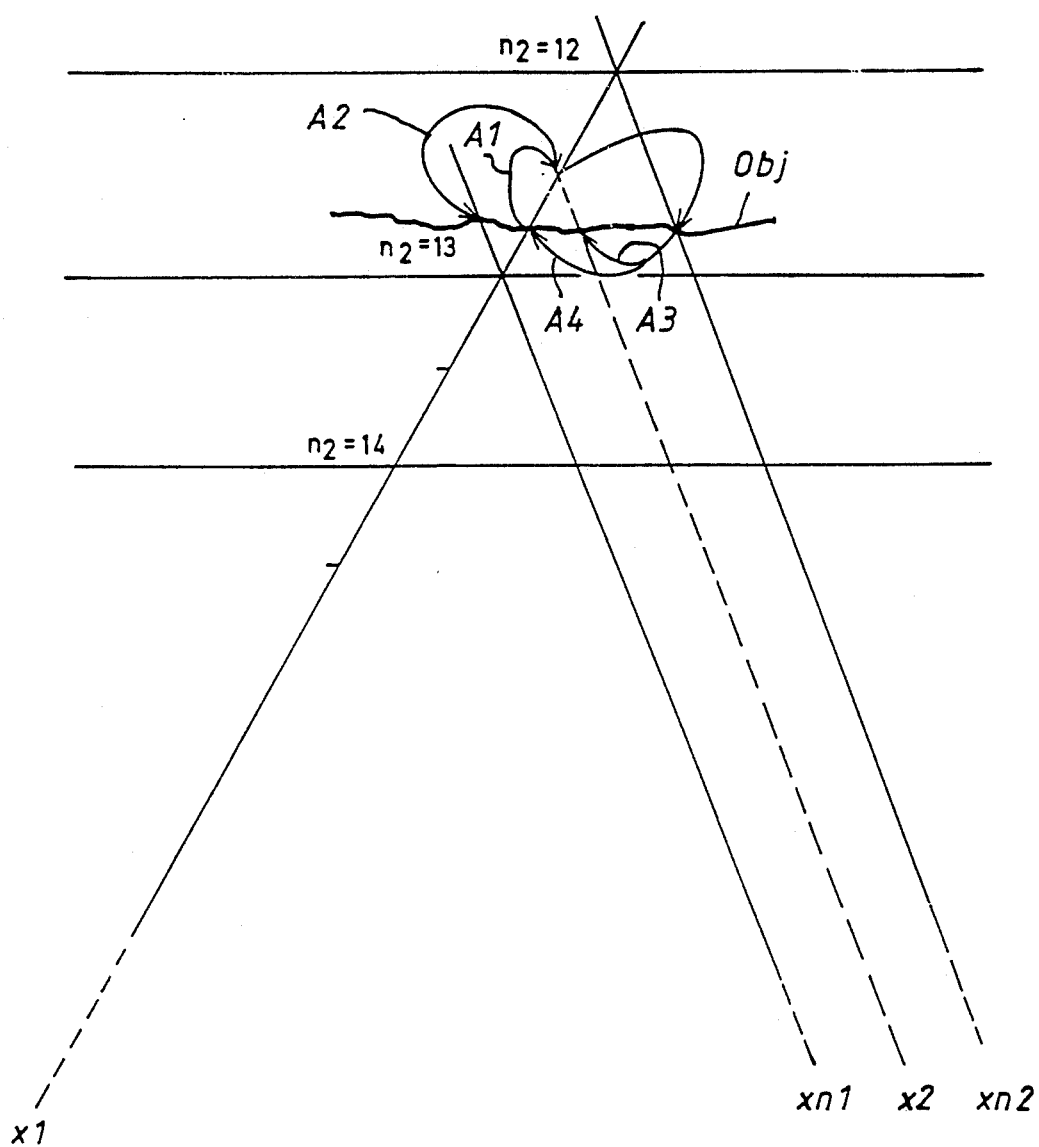
FIGS. 3a and 3b are diagrammatic explanations for mathematical procedures for combining both sets of beat phases recorded by the two cameras.
Figure 3B:
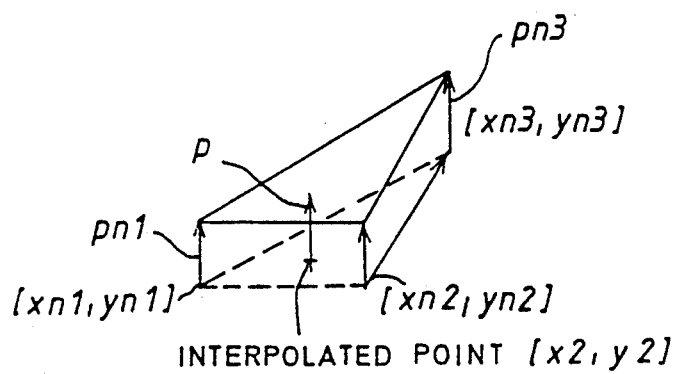

FIGS. 3a and 3b show how, using a pixel located at local coordinate xl on camera (1), a corresponding object point is determined. On the line of vision of pixel x1, a few of the 10 approximate positions between $z_v$ and $z_h$ are entered; they can be distinguished by the first camera, assuming that the phase determination is accurate up to 1/10 of a fringe. For those discretization steps where the order of the short beat changes incrementally, this is noted as well (n2=12..14). Illustrated are a part of the contour of the object (Obj) to be measured and two lines of vision originating from the two pixels xn1 and xn2 on camera (2). The starting point is where the line originating at pixel x1 intersects the object. Inasmuch as the phase of the long beat is determined only in discrete steps, for example in 8-bit steps, a slightly too large Z-coordinate will be measured rather than the indicated desired points, e.g., the point identified by the arrow (A1) for which in the drawn example no pixel line of vision extends from the second camera. The position of the corresponding point on the camera (2) is computed and—via the line of vision indicated by the broken line—the point [x2, y2] between the camera pixels is reached (in FIG. 3a indicated only as x2). If yp1≠yp2, the point i.a. is located between the lines, as well as between the columns. The arrows (A2) lead to the adjacent points [xn1, yn1], [xn2, yn2], and [xn3, yn3] in FIG. 3b. The phase at the interpolation point is computed from these points and the phases existing there.

FIG. 3b shows the camera pixels and the measured phase values (pn1, pn2, pn3) from which order jumps have been eliminated, as well as the interpolated value (p). The arrow (A3) shows the phase determination at the point which would be seen by the camera at the point [x2, y2] if there were a pixel.

Before interpolating, sudden order jumps between adjacent measured points must be taken into account, e.g., with the following logical program sequence:

```
IF (pn1 < (1/2) THEN
    IF ((pn2 ≧ (1/2) AND (pn2−pn1) ≧ (1/2)) THEN
        pn2=pn2−1;
    END;
    IF ((pn3 ≧ (1/2) AND (pn3−pn1) ≧ (1/2)) THEN
        pn3=pn3−1;
    END;
ELSE
    IF ((pn2 < (1/2) AND (pn1−pn2) ≧ (1/2)) THEN
        pn2=pn2+1;
    END;
    IF ((pn3 < (1/2) AND (pn1−pn3) ≧ (1/2)) THEN
        pn3=pn3+1;
    END;
END;
```

The pn1..pn3 modified in this manner is used to compute the linearly interpolated phase:

$$d_2 = (x2*[(pn2−pn3)yn1+(pn3−pn1)yn2+(pn1−pn2)yn3]−\\yn*[(pn2−pn3)xn1+(pn3−pn1)xn2+(pn1−pn2)xn3]+\\(pn3*xn2−pn2*xn3)yn1+(pn1*xn3−pn3*xn1)yn2+(pn2*xn1−\\pn1*xn2)yn3)/\\((xn2−xn3)yn1+(xn3−xn1)yn2+(xn1−xn2)yn3);$$

If interpolation results in a negative $d_2$, the order at the interpolation point is lower than at the point [xn1, yn1]. Inasmuch as the computation is continued with ($n_2+d_2$), the correct value of Z is obtained even with a negative $d_2$.

The interpolation may also be performed using 4 adjacent points instead of 3. In this case sudden phase variations must be eliminated first from the measured phase value (pn4) as described above. Then the following computation is performed:

$$d_2 = (x2*y2*[pn2−pn1+pn3−pn4]+\\x2*[(pn4−pn2)yn1+(pn1−pn3)yn2]+\\y2*[(pn4−pn2)xn1+(pn1−pn3)xn2]+\\(pn4*xn1+pn2*xn2)yn1+(pn3*xn1−pn1*xn2)yn2)/\\((xn2−xn1)*(yn1−yn2))$$

considering the setup of FIG. 1, one additional viewing operation may provide the object coordinates [y, y, z]. Actually there are two short beats:
1. between the projector and the camera (2),
2. between the two cameras.

The beat between the two cameras may also be interpreted as follows: The grating phase p1(x1, y1) is at [x1, y1] on camera (1). The point [x2, y2] on camera (2) is located i.a. between the pixels; only measurements at the adjacent pixels are available. Inasmuch as this relates to the same point on the object and the same pattern is viewed, the same grating phase exists at this point. Using grating phases at the adjacent pixels and taking into consideration possible order jumps, the X-coordinate [ix2, y2] on camera (2) is computed; here the interpolated grating phase coincides with that measured on camera (1). The position [x, y, z] results from [x1, y1] and ix2 and the position of the cameras relative to each other. In this way the Z-coordinate of the point seen by [$x_1$, $y_1$] is determined—arrow (A4) in FIG. 3a. To make this procedure practicable, the grating phase must change by less than one half order between camera pixels.

This method of evaluation is particularly favorable when the grating is moved repeatedly perpendicular to the grating lines. If the grating is not moved precisely in the grating plane, the long beat is affected here, however, not the short one, which provides the final position. Therefore, high tolerances are permissible considering the grating support.

FIG. 4 is a more detailed illustration of the embodiment of FIG. 1 in schematic but partially perspective form. The projection lens (0) and the camera lenses (1, 2) are shown. The lines of the grating (G) extend in the Y-direction. The lenses (0, 1, 2) are mounted to a support (14) of a material exhibiting low thermal expansion (e.g., ZERODUR OR INVAR). The same support (14) also acts as spacing means for the camera chips and the parallelogram guide (7) which supports the grating (G) so it may be shifted in its planes.

The grating (G) is driven in a controlled manner by means of a micrometer screw (8) actuated by a stepping motor. The stepping motor (9) connected with the micrometer screw is controlled by the computer (10). The camera chips ($K_1$, $K_2$) are connected via appropriate interfaces with the image processor (11) which is also resident in the computer (10). The phase measurement, in this case, is performed by known 4-point algorithms with phase shifting and produces residual phases in integral multiples of 1/256. Then the evaluation is continued as above. The measured results are then displayed with the use of a plotter (12) or by a video monitor (13).

FIG. 5 shows a system comprising a projector (P1) with a Ronchi grating (G) and the two viewing cameras (B3, B4) with the corresponding camera chips (K3, K4). The projector has a slit diaphragm which assures that the intensity characteristic of the projected grating image is approximately sinusoidal. The main points on the measured object are on the X-axis of the drawing plane. The zero-point of the X-axis is assumed to be in the main point of (P1). In order to avoid cluttering the drawing, the lenses are again represented only by a main point. The optical axes indicated by a chain line are aligned in such a manner that they intersect at point M in the center of the measured volume. In this case the projection grating is perpendicular to the optical axis of the projector.

The camera chips are positioned perpendicular to the corresponding optical axes. Therefore, a camera chip need not be installed in an offset manner, but a conventional setup may be used where the optical axis impinges approximately on the center of the chip. The lines of grating (G) extend perpendicularly to the drawing plane; the same applies to the columns of the camera chips. When this setup is used, the least distortion problems are incurred with the lenses. However, the areas having the same beat phases are no longer planes in Z-direction but cylinder-like surfaces above the dotted curves perpendicular to the drawing plane. The dotted curves are not indicated true to scale but at a much greater distance than in reality. At the curve (W), indicated by the dotted line having the larger spaces between the dots, the beat phase between projector and camera (B4) accounts for one period; and at the curve (E), indicated by the dotted line having the smaller spaces between the dots, the beat phase between projector and camera (B3) accounts for one period; this means, the beat phase has a value of 'one'. These curves are described by Formulae 4 by Idesawa et al., "Scanning Moire Method and Automatic Measurement of 3-D Shapes", *Applied Optics*, Vol. 16, No. 8 (1977), pp 2152–2162.

Inasmuch as (B4) is at a greater distance from (P1) than (B3), the areas with the closely spaced dots are closer to each other than those areas with the larger spaces between them. This fact permits the use of phase measurements with (B3) and (B4) to cover a zone of several such areas in Z-direction in an unambiguous manner. Using (B4) alone, one depth corresponding to the distance between two adjacent curves (small spaces between dots) could be measured in an unambiguous manner.

In order to evaluate the measured values, the grating phase (p1) at the camera pixel [x1, y1] on (B4) is used to compute the beat phase by $\mod(p1 - (a_0/(g_0 \ast a_1)) \ast x1, 1)$. The coordinates and the geometric distances, as well as the grating period, correspond to those of FIG. 1. Idesawa's formula is used to compute the ambiguous $z'_k$, whereby k represents the specific order. To obtain $z'_k$, the values $x'_k$ and $y'_k$ are computed. Therefore, when computing $[x2_k, y2_k]$ from $[x'_k, y'_k, z'_k]$, the orientation of the camera chips relative to each other must be given consideration. Now, using a neighboring pixel of $[x2_k, y2_k]$, the fringe phase $p2_k$ at $[x2_k, y2_k]$ is interpolated. That k, for which the value of $(p2_k - p1)$ is minimal, represents the correct order. The corresponding $[x'_k, y'_k, z'_k]$ is the coordinate of the point which is seen by [x1, y1] on (B4).

The example of embodiment of FIG. 5 uses the long beat between two cameras which are close to each other in X-direction in order to determine the approximate position and a short beat between one of the cameras and the projector at a great distance for fine-tuning. The advantage of this is that similar illumination conditions exist for both camera viewing directions. If the sample to be measured is shiny, it may be rotated before measuring in such a manner that the highlights no longer create an interference.

In order to attain this advantage, a small offset in Y-direction may be acceptable because of the small required offset in X-direction; in this way the camera lenses do not block each other's paths. However, in this case it is sensible to align the camera chips in parallel direction to keep computations simple. If there is an offset in Y-direction, the pixels on camera (2), however, generally have a different Y-position than on camera (1); as in the case of the X-direction, the correlation is a function of Z. When searching for appropriate combinations of solutions, the computation need be carried out only in a small neighborhood and only in the Y-direction.

When the method is employed in practice, adjustment errors of the measuring device should be taken into consideration. In addition, the desire to have exactly one beat order at the front end, as well as at the rear end, of the measured volume constitutes an unnecessary restriction. A reference measurement is carried out and, in so doing, the reference phases $r_1$ and $r_2$ are measured. In order to keep the computations simple, the measurement is advantageously carried out on a plane perpendicular to the Z-axis of the device at a distance $z_r$. Then p ($0 \leq p \leq 1$) identifies the measured grating phase and the $n^{th}$ solution $z_n$ is expressed as $$z_n = -a_0 \ast xp/(s + g_0 \ast (n + \mod(p-r), 1)),$$

whereby $r = r_1$ or $r_2$, $xp = xp_1$ or $xp_2$, and s represents the corresponding setpoint phase including the order at $z_r$. The index indicates for which camera (1, 2) the computation is carried out. Considering the formula, the term $\mod(p-r, 1)$ is zero in the reference position; this means that the correct Z-position is reproduced for $n = 0$.

The method described here not only works when the camera chips and the projection grating are aligned parallel; however, the procedure is more easily understood when expressed in this manner. Initially, it is not absolutely necessary to align the camera's columns parallel with the grating. After rotating the camera by 90 degrees, the lines may be viewed as gratings and the procedure may be continued as described above. In the case of some phase measurement algorithms, it is advantageous to have the 45-degree direction or another default direction contained in the camera chip as grating direction. Following the appropriate coordinate transformation, the procedure is continued in the same manner.

Obviously the two-step procedure described herein can be expanded into a multiple-step procedure where appropriate by adding cameras at suitable points. Also, additional cameras may be used for recording and measuring different perspectives of the measured object.

The method as illustrated for central projection can also be used in the same manner with parallel projection. In that case the directions of projection (angles subtended by the optical axes) assume the part of the distances between the lenses from each other.

We claim:
1. A method for the three-dimensional optical measuring of an object surface area defining ambiguous object coordinates, said method comprising:
    projecting a grating pattern on said object surface;
    recording said projected grating pattern on two video cameras, each said camera having a plurality of pixels, and said projected grating pattern being recorded on each camera as an image pattern with a plurality of image points; and using an analytical computer connected with said video cameras to compute the topography of said object surface by:

separately computing fringe phases for the image patterns recorded by each camera, and using a combination of said separate fringe phases of both cameras to compute unambiguous object coordinates within a predetermined measuring area.

2. The method of claim 1 wherein said step for computing the unambiguous object coordinates further comprises:

determining a number of possible solution coordinates within a measured volume, basing said determination on one fringe phase at one said image point of a first one of said cameras; and using said solution coordinates to determine corresponding image points on the recorded image of said second camera.

3. The method of claim 2 further comprising computing the fringe phases for said image points of the second camera by interpolating the fringe phases at adjacent camera pixels.

4. The method of claim 3 further comprising, prior to said interpolation step, eliminating order jumps between the fringe phases at adjacent camera pixels.

5. The method of claim 2 further comprising:
computing the differences between
the fringe phases at the image points of the second camera associated with the solution coordinates and
the fringe phase at the corresponding image point of the first camera;
selecting the image point of the second camera at which said computed difference is minimal; and
using the fringe phase of said selected image point to compute said unambiguous object coordinate for that point of the object surface.

6. The method of claim further comprising:
computing a second set of solution coordinates based on fringe phases at the image points of the second camera associated with said first set of solution coordinates; and
selecting the second solution coordinate exhibiting the smallest distance value relative to one of the first solution coordinates, whereby the selected solution coordinate represents said unambiguous object coordinate on said object surface.

7. In apparatus for three-dimensional measurement of object surfaces including a grating projector for the projection of grating patterns on the object surface, at least a first and a second video camera for recording video images of said grating pattern projected on the object surface, and an analytical computer connected with the video cameras for computation of the topography of the object surface, the improvement comprising:
positioning said cameras and said projector being positioned relative to each other so that
the lens of said first camera is located at a predetermined distance from the lens of the projector, said predetermined distance being substantially smaller than the distance between the lens of said second camera and the lens of said projector.

8. The apparatus of claim 7 wherein:
said predetermined distance between said first camera lens and said projector lens is selected so that the fringe phases computed from the grating patterns recorded with said first camera produce unambiguous approximate solutions for all object coordinates within a predetermined measured volume; and said distance between said lenses of said second camera and said projector is selected so that the fringe orders associated with said video images of said second camera can be unambiguously computed from said video images of said first camera.

9. The apparatus of claim 7 wherein said projector further comprises a projection grating, said cameras each further comprise respective sensor areas, and said sensor areas are located on a common plane.

10. The apparatus of claim 9 wherein said lenses of said cameras and said projector further comprise main points, and all of said main points are located on a second plane.

11. The apparatus of claim 10 wherein said common plane and said second plane are parallel.

12. The apparatus of claim 8 wherein the optical axes of said lenses of said cameras and said projector all intersect at a common point within said preset measured volume of said object surface.

13. The apparatus of claim 12 wherein said projector further comprises a projection grating located perpendicular to the optical axis of said projection lens, and a respective sensor area is located perpendicular to the optical axis of each respective camera lens.

14. The apparatus of claim 7 wherein said projected grating pattern comprises light and dark lines having the same width.

15. The apparatus of claim 7 wherein said projected grating pattern exhibits a sinusoidal intensity characteristic transverse to the direction of the pattern lines.

16. In apparatus for three-dimensional measuring of object surfaces including a grating projector for the projection of a grating pattern on the object surface, at least a first and a second video camera for recording video images of the grating pattern projected on the object surface, and an analytical computer connected with said video cameras for the computation of the topography of the object surface, the improvement comprising:
the lenses of said two video cameras are each positioned at a different respective distance from the lens of the projector; and
the quantitative value of the difference between said respective distances is substantially smaller than the value of each said respective distance.

17. The apparatus of claim 16 wherein said camera lenses are positioned adjacent to each other.

18. The apparatus of claim 16 wherein said projector further comprises a projection grating, said cameras each further comprise respective sensor areas, and said sensor areas are located on a common plane.

19. The apparatus of claim 18 wherein said lenses of said cameras and said projector further comprise main points, and all of said main points are located on a second plane.

20. The apparatus of claim 19 wherein said common plane and said second plane are parallel.

21. The apparatus of claim 16 wherein the optical axes of said lenses of each said camera and of said projector all intersect at a common point within a preset measured volume of said object surface.

22. The apparatus of claim 21 wherein said projector further comprises a projection grating located perpendicular to the optical axis of said projector lens, and a respective sensor area is located perpendicular to the optical axis of each respective camera lens.

23. The apparatus of claim 16 wherein said projected grating pattern comprises light and dark lines having the same width.

24. The apparatus of claim 16 wherein said projected grating pattern exhibits a sinusoidal intensity characteristic transverse to the direction of the pattern lines.

25. The method of claim 3 further comprising:
arranging a projector to project said grating pattern onto said object surface by central projection; and
positioning said video cameras so that said grating patterns are imaged onto both said cameras in central projection.

26. In apparatus for three-dimensional measurement of object surfaces including a grating projector for the projection of grating patterns on the object surface, at least a first and a second video camera for recording video images of said grating pattern projected on the object surface, and an analytical computer connected with the video cameras for computation of the topography of the object surface, the improvement comprising:
said projector being arranged to project said grating patterns onto said object surface by central projection;
said video cameras being arranged so that said grating patterns are imaged onto both said cameras in central projection; and
said cameras and said projector being positioned relative to each other so that
the lens of said first camera is located at a predetermined distance from the lens of the projector, said predetermined distance being substantially smaller than the distance between the lens of said second camera and the lens of said projector.

27. In apparatus for three-dimensional measuring of object surfaces including a grating projector with a lens for the projection of a grating pattern on the object surface, at least a first and a second video camera with respective lenses for recording video images of the grating pattern projected on the object surface, and an analytical computer connected with said video cameras for the computation of the topography of the object surface, the improvement comprising:
the lens of said projector being arranged to project said grating patterns onto said object surface by central projection;
the lenses of said video cameras being arranged so that said grating patterns are imaged onto both said cameras in central projection; and
the lenses of said two video cameras also being each positioned at a different respective distance from the lens of the projector so that the quantitative value of the difference between said respective distances is substantially smaller than the value of each said respective distance.

* * * * *